United States Patent Office 3,087,911
Patented Apr. 30, 1963

3,087,911
PROCESS FOR PREPARING A THERMOPLASTIC MATERIAL
Bruce S. Ainsworth, Jr., Mountain Lake, N.J., assignor to Celanese Corporation of America, New York, N.Y., a corporation of Delaware
No Drawing. Filed Aug. 5, 1957, Ser. No. 676,387
7 Claims. (Cl. 260—67)

This invention relates to a process for preparing a thermoplastic material and particularly to a process for preparing a tough, thermally stable, high molecular weight thermoplastic polymer from trioxane.

Trioxane is a cyclic trimer of formaldehyde having a six-membered heterocyclic ring consisting of alternating oxygen atoms and methylene groups. It melts at 64° C. and boils without decomposition at approximately 115° C. It is known that trioxane, upon repeated sublimation in a sealed bent tube at a temperature of 46° C. produces a small amount of non-volatile polymer which has been called epsilonpolyoxymethylene.

It has now been found that much higher yields of tough, thermally stable, high molecular weight thermoplastic material may be prepared by maintaining the trioxane above its melting point but below its boiling point, passing vapors out of the molten trioxane and cooling the vapors rapidly in the immediate vicinity of the molten trioxane by at least 5° C. Preferably, the molten trioxane is maintained at a temperature between about 70° and about 115° C. and the cooling is effected by passing a stream of cold gas, over the surface of the vessel containing the molten trioxane or keeping a cold solid surface just above the upper surface of the molten trioxane.

The high molecular weight material deposits on the surface of the molten trioxane and on the surface of the containing vessel or the cold solid surface at a level just above the molten trioxane.

In order to obtain good yields of polymer, the vapors leaving the trioxane melt should be cooled by at least 5° C. in the immediate vicinity of the melt. Best yields are obtained when the vapors are cooled by between about 5° and 25° C. Cooling by greater temperature differences continues to produce polymer, but in lesser quantities. Preferably, the temperature at which the polymer is formed should be above the melting point of trioxane to avoid contamination of the polymer with another solid phase material. However, if desired, polymer may be formed at a temperature below the trioxane melting point and the polymer later purified by heating the mixture to above the melting point of trioxane.

Final purification is accomplished by washing with water, preferably boiling water, followed by air drying. The polymer produced is white and stringy. It possesses no trioxane odor. The polymer may be compression molded when stabilized with diphenylamine to produce shaped articles which are tough and which are thermally stable.

It is essential for good polymer yields to cool the vapors as soon as they are formed by at least 5° C. This is accomplished by cooling at a location immediately above the upper surface of the liquid. The precise level above the surface at which the cooling may be effected depends, naturally on the dimensions of the surface since large surfaces require more cooling and hence larger feed lines for the cooling medium. In general, the terms "immediately above" or "just above" the surface, as used herein, mean not higher than a level above the surface by about 25% of the narrowest dimension of the surface and preferably by about 3 to 5%.

The process is generally carried out in an air atmosphere at atmospheric pressures. If desired, an inert gas such as nitrogen or methane may be used in the space above the molten trioxane. If desired, pressures higher than atmospheric may be used.

If desired, the polymer may be produced in a continuous system wherein molten trioxane is maintained in a vessel having a cooled condenser just above the surface of the melt. The trioxane is constantly stirred and the condenser is constantly scraped so that the polymer formed drops into the body of molten trioxane and is suspended therein. A stream of trioxane-polymer suspension is continuously drawn off, passed through a filter and returned to the body of trioxane. The polymer is filtered out and recovered. A stream of pure trioxane, equivalent in weight to the polymer recovered, is continuously fed into the system. If desired, stirring and vaporization in the molten mass may be aided by sparging with air or with an inert gas.

Example 593 parts by weight of filtered trioxane of high purity was heated to 114.5° C. in a vessel equipped with a water cooled condenser for trioxane recovery. Cold air was directed against the outside of the vessel just above the surface of the molten trioxane. The process was continued for a total of 18 hours with an overnight interruption at room temperature. Initially, the polymer floated on the molten trioxane, but eventually the upper part of the vessel and condenser filled with solid product. The contents of the vessel were heated to the boiling point of trioxane and filtered. The polymer was washed twice with 300 parts by weight of boiling water used for each washing and then air dried. 173 parts by weight of polymer having a melting point of about 175° C. was recovered. After stabilization with 5% by weight of diphenylamine, the polymer was stable for more than 7 days at 105° C. and a molded sheet, 5 mils in thickness could be creased back and forth along a line 100 times without cracking. Other properties of the diphenylamine-stabilized polymer are shown in the table below:

| Property | Value | Units | Test |
|---|---|---|---|
| Flexural strength | 12,000 | p.s.i. | ASTM D790. |
| Flexural modulus | 300,000 | p.s.i. | SATM D790. |
| Tensile strength | 7,000 | p.s.i. | ASTM D638. |
| Izod impact strength | 1.4–2.1 | foot lbs./in. | ASTM D256. |
| Rockwell Hardness | M73 | | ASTM D785. |
| Deformation, 2,000 p.s.i. @ 122° F | 1.5 | percent | ASTM D621. |
| Heat Distortion at 264 p.s.i. | 80 | ° C. | ASTM D648. |
| Inherent Viscosity | 1.37 | | at 0.5% by weight in chlorophenol at 60° C. |

It is to be understood that the foregoing detailed description is merely given by way of illustration and that many variations may be made therein without departing from the spirit of my invention.

Having described my invention, what I desire to secure by Letters Patent is:

1. A process for preparing a tough, thermally stable, high molecular weight thermoplastic material which comprises maintaining molten trioxane at a temperature below its boiling point, passing vapors out of said molten trioxane and rapidly cooling said vapors at least 5° C. to polymerize said trioxane vapors into high molecular weight polyoxymethylene which is insoluble in trioxane and recovering said polyoxymethylene as a product of the process.

2. A process for preparing a tough, thermally stable high molecular weight thermoplastic polymer which comprises maintaining a body of molten trioxane at a temperature below its boiling point in a vessel with a space above said body, passing vapors out of said molten trioxane into said space and cooling said vapors in said space at a location immediately above said body at least 5° C. to polymerize said trioxane vapors into high molecular weight polyoxymethylene which is insoluble in trioxane and recovering said polyoxymethylene as a product of the process.

3. A process for preparing a tough, thermally stable, high molecular weight polymer which comprises maintaining a body of molten trioxane at a temperature between about 70° and about 115° C. in a vessel with a space above said body, passing vapors out of said molten trioxane into said space and cooling said vapors in said space at a location immediately above said body between about 5° and about 25° C. to polymerize said trioxane vapors into high molecular weight polyoxymethylene which is insoluble in trioxane and recovering said polyoxymethylene as a product of the process.

4. A process for preparing a tough, thermally stable, high molecular weight polymer which comprises maintaining a body of molten trioxane at a temperature between about 70° and about 115° C. in a vessel with a space above said body, passing vapors out of said molten trioxane into said space and cooling said vapors between about 5° and 25° C. at a level not higher above the surface of the molten trioxane than about 25% of the narrowest dimension of the surface to polymerize said trioxane vapors into high molecular weight polyoxymethylene which is insoluble in trioxane and recovering said polyoxymethylene as a product of the process.

5. A process for preparing a tough, thermally stable, high molecular weight polymer which comprises maintaining a body of molten trioxane at temperature below its boiling point in a vessel with a space above said body, passing vapors out of said molten trioxane into said space and cooling said vapors on a cold solid surface just above the upper surface of the molten trioxane to deposit a polymeric material on said solid surface, scraping said solid surface to remove said polymeric material therefrom and permitting said polymeric material to fall into said body of molten trioxane and recovering said polymer from at least a portion of said trioxane by filtration.

6. A process for continuously preparing a tough, thermally stable, high molecular weight polymer which comprises maintaining a body of molten trioxane at a temperature between about 70° and about 115° C. in a vessel with a space above said body, continuously stirring said body of molten trioxane, passing vapors out of said molten trioxane into said space and cooling said vapors on a cold surface just above the upper surface of the molten trioxane between about 5° and 25° C. to deposit a polymeric material on said solid surface, continuously scraping said solid surface to remove said polymeric material therefrom and permitting said polymeric material to fall into said body of molten trioxane and be suspended therein, continuously removing from said body of molten trioxane a stream of molten trioxane having a polymeric material from said stream by filtration and returning the remainder of said stream of fresh trioxane, equivalent in weight to the polymer recovered, to said body of molten trioxane.

7. The process of claim 1 wherein said vapors are cooled on a cold solid surface.

References Cited in the file of this patent

UNITED STATES PATENTS

| 2,768,994 | MacDonald | Oct. 30, 1956 |
| 2,795,571 | Schneider | June 11, 1957 |

OTHER REFERENCES

Walker: "Formaldehyde," Reinhold, 1953, pp. 146–148.

Walker: "Formaldehyde," Reinhold, 1953, pp. 142–143.

Staudinger: "Hochmolekulare Organische Verbindungen, pp. 280–287 (1932).